United States Patent
George (10) Patent No.: US 8,968,108 B2
(45) Date of Patent: Mar. 3, 2015

(54) AXIALLY RESTRAINING TORSIONAL SPRING UTILIZING A TAPERED SHAFT

(71) Applicant: Jeffrey L. George, Saint Charles, IL (US)

(72) Inventor: Jeffrey L. George, Saint Charles, IL (US)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/712,772

(22) Filed: Dec. 12, 2012

(65) Prior Publication Data

US 2014/0159294 A1    Jun. 12, 2014

(51) Int. Cl.
*F16D 3/68*     (2006.01)
*F16F 7/00*     (2006.01)
*F16F 1/54*     (2006.01)

(52) U.S. Cl.
CPC .. *F16F 7/00* (2013.01); *F16F 1/545* (2013.01)
USPC .............................................. 464/83; 464/82

(58) Field of Classification Search
USPC .................... 188/378–380; 74/573.12, 575.4; 464/82, 83
See application file for complete search history.

(56) References Cited

U.S. PATENT DOCUMENTS

| | | | | |
|---|---|---|---|---|
| 1,772,495 A * | 8/1930 | Powell | ............................ | 464/83 |
| 2,398,261 A * | 4/1946 | Stone | ....................... | 192/45.017 |
| 2,712,742 A * | 7/1955 | Neidhart | ......................... | 464/83 |
| 3,436,069 A * | 4/1969 | Henschen | ...................... | 267/279 |
| 3,482,464 A * | 12/1969 | Angst et al. | ..................... | 74/470 |
| 3,673,813 A * | 7/1972 | Wright | ............................. | 464/24 |
| 3,783,639 A * | 1/1974 | Goodman et al. | .............. | 464/83 |
| 4,012,923 A * | 3/1977 | Lundgren | ........................ | 464/90 |
| 4,551,115 A * | 11/1985 | Ferguson | ........................ | 464/83 |
| 4,659,069 A * | 4/1987 | Odobasic | ........................ | 267/280 |
| 4,667,530 A * | 5/1987 | Mettler et al. | .................. | 74/493 |
| 5,591,083 A * | 1/1997 | Kirschey | ........................... | 464/83 |
| 5,709,605 A * | 1/1998 | Riefe et al. | ...................... | 464/83 |
| 7,195,307 B2 * | 3/2007 | Tucker et al. | ............ | 296/190.05 |
| 7,543,365 B2 * | 6/2009 | Van Mill et al. | ........... | 29/407.02 |
| 7,716,787 B2 * | 5/2010 | Duning et al. | ................... | 16/330 |

* cited by examiner

*Primary Examiner* — Christopher Schwartz (74) *Attorney, Agent, or Firm* — Mark Ussai; SKF USA Inc. Patent Dept.

(57) ABSTRACT

A rotational and axial control spring includes a tubular casing, a shaft, and a plurality of elongated elastomeric members. The casing comprises a tubular cross sectional equilateral convex polygon shape, the tubular shape extending uniformly between a first and second casing end. The shaft is fabricated having a cross sectional shape mimicking the equilateral convex polygon casing shape, a series of exterior surfaces extending longitudinally between a first smaller end and second larger end, wherein the exterior surfaces form a square frustum shape. The elastomeric members are formed as cylindrical frustums. The shaft is inserted within the casing interior. Each elastomeric member is positioned contacting a respective shaft exterior surface and a pair of adjacent casing interior surfaces. The elastomeric members provide rotational spring with adjustable resistant force and dampening functions. The tapered features provide an axial retention function.

20 Claims, 9 Drawing Sheets

AXIALLY RESTRAINING TORSIONAL SPRING UTILIZING A TAPERED SHAFT

FIELD OF THE INVENTION

The present invention relates to a device that manages torsional deflection and an axial force. More specifically, the device comprises a shaft retained within a casing by a series of conically shaped elastomeric elongated members, wherein the shaft is formed having a trapezoid longitudinal cross sectional shaped exterior surface contouring to surfaces of the series of conically shaped elastomeric elongated members.

BACKGROUND OF THE INVENTION

Discussion of the Related Art

Rotational rubber springs or dampeners offer resistance in a torsional direction. Rotational rubber springs are commonly referred to as Neidhart springs. Neidhart springs are formed having a shaft retained within an interior of a tubular casing by a series of elastomeric elongated members. Each of the members is designed having a uniform cross sectional shape along their length. Each of the elastomeric elongated members is retained between and contacting a planar exterior surface of the shaft and each of two planar interior surfaces of the casing, wherein the two planar interior surfaces of the casing are joined by a common corner. In operation, as the assembly is subjected to a torsional force, the one of the shaft and casing is rotated respective to the other member. The rotational difference compresses each of the elastomeric elongated members. The compression generates a resistance to the applied torsional force. The resistance is provided in a form of a spring and a damper.

The currently known design has a significant limitation. The design has a uniform cross sectional shape extending along an entire length of the device. The elements are commonly fabricated using an extruding process, cut to length, then assembled by slideably inserting the shaft and elastomeric elongated members within the interior of the casing. Although the currently known design controls a torsional force by dampening rotational motion and returning the device to a neutral configuration, the uniform cross sectional shape fails to control any axial forces.

Thus, what is desired is a device that controls a torsional force by dampening rotational motion and returning the device to a neutral configuration, while additionally providing an axial constraint.

SUMMARY OF THE INVENTION

The present invention is directed to a device that controls a torsional force by dampening rotational motion and returning the device to a neutral configuration, while additionally providing an axial constraint.

In a first aspect of the present invention, a torsional spring and axial control device comprising:

a shaft having a plurality of planar exterior surfaces extending between a peripheral edge of a first shaft end and a peripheral edge of a second shaft end, wherein a cross sectional area of the first shaft end is smaller compared to a cross sectional area of the second shaft end and a cross sectional shape that gradually transitions in size between the first shaft end and the second shaft end;

a series of elongated elastomeric members, each elongated elastomeric member having a first elastomeric member end and a second elastomeric member end, wherein the first elastomeric member end has a smaller cross sectional area compared to a cross sectional area of the second elastomeric member end and a cross sectional shape of the elastomeric member that gradually transitions in size between the first elastomeric member end and the second elastomeric member end; and a tubular casing comprising a plurality of planar interior surfaces defining a casing interior, wherein adjacent pairs of planar interior surfaces are joined at an angular transition, wherein the shaft is inserted within the casing interior and each of the series of elongated elastomeric members is positioned contacting one respective exterior planar shaft surface and a pair of adjacent interior planar casing surfaces, wherein the series of elongated elastomeric members provides a resistive rotational spring force between the shaft and the casing.

In a second aspect of the present invention, the gradual transition of the cross sectional shape of each of the elongated elastomeric members is linear along a length thereof.

In another aspect of the present invention, the gradual transition of the cross sectional shape of the shaft is linear along a length thereof.

In yet another aspect, the shaft is fabricated having an external surface provided in a square frustum shape.

In yet another aspect, the tubular casing is fabricated having a uniform cross sectional shape along a length thereof.

In yet another aspect, the shaft is fabricated of a rigid material.

In yet another aspect, the shaft is fabricated of a pliant material.

In another aspect, the shaft is fabricated of a pliant material laminated upon an exterior surface of a rigid material.

In yet another aspect, the shaft is fabricated having a twisted configuration.

In yet another aspect, each of the external planar shaft surfaces has like transverse dimensions and each of the interior planar casing surfaces having like transverse dimensions.

In yet another aspect, the shaft comprises four external planar surfaces and the casing comprises four interior planar surfaces.

In yet another aspect, each of the four external planar shaft surfaces have like transverse dimensions and each of the four interior planar casing surfaces having like transverse dimensions.

In yet another aspect, the shaft comprises three external planar surfaces and the casing comprises three interior planar surfaces.

In yet another aspect, the shaft comprises five external planar surfaces and the casing comprises five interior planar surfaces.

In yet another aspect, the shaft comprises six external planar surfaces and the casing comprises six interior planar surfaces.

In yet another aspect, the shaft comprises n external planar surfaces and the casing comprises n interior planar surfaces, wherein n is selected from a number of surfaces group comprising three, four, five, six, and eight.

In another aspect, a first rotational and axial control spring is oriented proximate a second rotational and axial control spring, wherein like sized casing ends are positioned adjacent to one another.

In yet another aspect, the rotational and axial control spring further comprises an axial retention member. The axial retention member is preferably located proximate a smaller casing end.

In yet another aspect, the shaft is configured having an hourglass elevation shape. The hourglass shape is formed by joining narrower ends of two polygonal frustum shaped elements together, wherein the polygonal frustum shaped elements are arranged having longitudinal axes oriented in a parallel arrangement.

In an alternative embodiment, the rotational and axial control spring can include a shaft configured having an hourglass shaped side profile and a series of elongated elastomeric members having a bi-conical frustum shape. The bi-conical frustum shape is formed by joining wider ends of two conical frustum shaped elements together, wherein the conical frustum shaped elements are arranged having longitudinal axes oriented in a non-parallel arrangement, wherein the bi-conical frustum shape forms a triangular profile having a linear edge spanning a length between the first elongated elastomeric member end and the second elongated elastomeric member end and a "V" shaped opposing edge.

In yet another aspect, tapered components of the rotational and axial control spring provides an axial control function limiting motion of the shaft to a single axial direction, wherein the single axial direction is from a larger elongated elastomeric member cross sectional area towards a smaller elongated elastomeric member cross sectional area.

In yet another aspect, tapered components of the rotational and axial control spring provides an axial control function limiting motion of the elongated elastomeric members to a single axial direction, wherein the single axial direction is from a larger shaft cross sectional area towards a smaller shaft cross sectional area.

In yet another aspect, tapered components of the rotational and axial control spring provides an axial control function limiting motion of the shaft and elongated elastomeric members to both axial directions.

The rotational and axial control spring provides several advantages over the currently available rotational rubber springs. Tapering the series of elongated elastomeric members and the respective tubular casing restricts axial motion of a mating element in a first direction. By integrating a pair of oppositely oriented rotational and axial control springs into an assembly, the pair of rotational and axial control springs restricts axial motion of the mating element in two directions. The elongated elastomeric members can be designed to optimize the dampening and spring rates by using the change in the cross sectional shape along the length thereof.

Another advantage over the currently available rotational rubber springs is that the tapered configuration reduces stress under torsional and axial loading.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF
REPRESENTATIVE EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
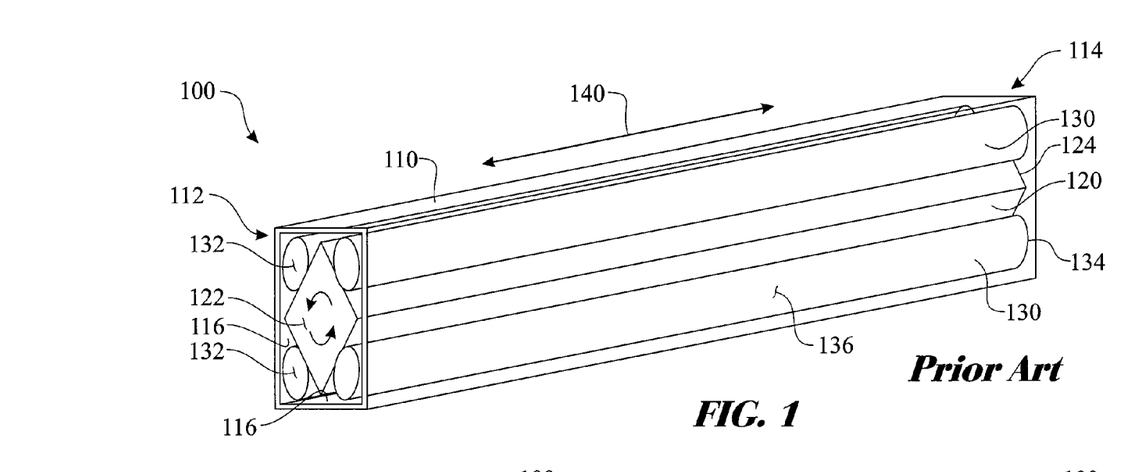
FIG. 1 presents an isometric view of an exemplary rotational rubber spring in accordance with the known art.
Figure 2:
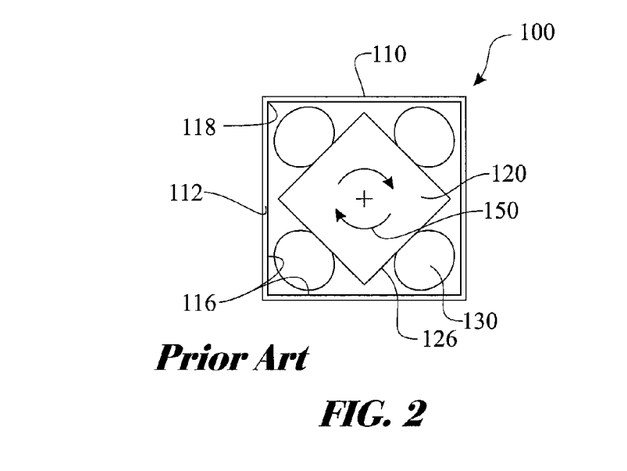
FIG. 2 presents an end elevation view of the rotational rubber spring originally introduced in FIG. 1, the illustration presenting the rotational rubber spring in a normal, relaxed state.
Figure 3:
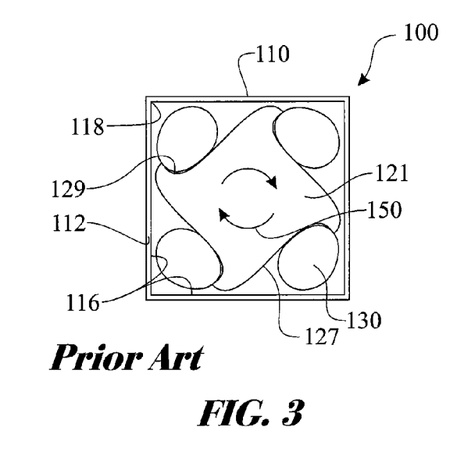
FIG. 3 presents an end elevation view of the rotational rubber spring originally introduced in FIG. 1, the illustration presenting the rotational rubber spring being subjected to a torsional force.

An exemplary rotational rubber spring 100, in accordance with known prior art is illustrated in FIGS. 1 through 3. The rotational rubber spring 100 integrates a tubular casing 110, a shaft 120, and a series of elongated elastomeric members 130 into a single assembly. The tubular casing 110 has a tubular cross section forming an equilateral convex polygon shape spanning between a first casing end 112 and a second casing end 114. The tubular casing 110 is designed having a uniform cross sectional shape extending a length thereof. Due to the uniform cross sectional area and low manufacturing cost, the tubular casing 110 is commonly manufactured using an extrusion process. The tubular casing 110 is preferably fabricated of a rigid material, such as plastic, metal, a composite, and the like. The interior of the tubular casing 110 defines a plurality of casing interior planar surfaces 116, wherein mating edges of each pair of adjacently located casing interior planar surfaces 116 forms a casing interior angular transition 118. The plurality of casing interior planar surfaces 116 defines a periphery of a casing interior volume. The exemplary embodiment includes four (4) equally dimensioned casing interior planar surfaces 116.

The shaft 120 has a cross section forming an equilateral convex polygon shape spanning between a shaft first end surface 122 and a shaft second end surface 124. The shape of the shaft cross section is similar to the cross sectioned shape of the casing cross section. An exterior of the shaft 120 is defined by a shaft first end surface 122 located at a first longitudinal end, a shaft second end surface 124 located as a second, opposite longitudinal end, and a plurality of shaft external longitudinal surfaces 126 spanning therebetween. The number of shaft external longitudinal surfaces 126 equals the number of casing interior planar surfaces 116. The shaft 120 is designed having a uniform cross sectional shape extending a length thereof. Like the tubular casing 110, due to the uniform cross sectional area and low manufacturing cost, the shaft 120 is commonly manufactured using an extrusion process. The shaft 120 is commonly fabricated of a pliant material. The shaft 120 is inserted into an interior of the tubular casing 110. The shaft 120 is rotated aligning each shaft external longitudinal surface 126 with a respective casing interior angular transition 118.

Each of the elongated elastomeric member 130 is designed having a uniform cross sectional shape extending along a length defined between an elongated elastomeric member first end surface 132 and an elongated elastomeric member second end surface 134. The exposed surface spanning between the elongated elastomeric member first end surface 132 and the elongated elastomeric member second end surface 134 is referred to as an elongated member exterior surface 136. The elongated elastomeric member 130 is fabricated of a rubber or other resilient material. Like the tubular casing 110 and shaft 120, due to the uniform cross sectional area and low manufacturing cost, the elongated elastomeric member 130 is commonly manufactured using an extrusion process. The elongated elastomeric member 130 can be fabricated having a circular or elliptical cross sectional shape.

In use, the elongated member exterior surface 136 of each elongated elastomeric member 130 engages with the respective shaft external longitudinal surface 126 and a pair of respective casing interior planar surfaces 116. The three contact points refrain rotation of the shaft 120 respective to the tubular casing 110 when subjected to a torsional force in a direction of a rotational motion 150. The shaft 120 deforms forming a shaft second end surface 124 in the area engaging with the respective elongated elastomeric member 130. When undergoing the rotational motion 150, the pliancy of the elongated elastomeric member 130 enables incremental rotation of the shaft 120 respective to the tubular casing 110. As the motion continues, the elongated elastomeric member 130 is compressed, wherein the compression of the elongated elastomeric member 130 increases the resistance of the rotational motion 150. In addition, the rotational motion 150 utilizes each elongated elastomeric member 130 as a wedge, thus further increasing the resistance to the rotational motion 150. When the torsional force is removed, the pliancy of each the series of elongated elastomeric members 130 returns the shaft 120 to a natural, relaxed position.

In an alternative embodiment, the rotational rubber spring 100 can include a twisted shaft 121, which includes a shaft elastomeric engaging deformation 129 for engaging with each elongated elastomeric member 130. The twisted section of the twisted shaft 121 increase the interaction between the twisted shaft 121 and the elongated elastomeric member 130. Additionally, the shape of the twisted shaft 121 increases the rotational distance of the twisted shaft 121 within the rotational rubber spring 100.

One limitation of the rotational rubber spring 100 is the freedom of motion in an axial direction, identified as axial motion 140. The uniform cross sectional shape enables axial motion of the various components and/or other mating equipment.

An exemplary rotational and axial control spring, identified by reference number 200, is presented in FIGS. 4 through 7. The rotational and axial control spring 200 includes elements having a tapered shape introducing an axial control feature.

The rotational and axial control spring 200 integrates a tubular casing 210, a shaft 220, and a series of elongated elastomeric members 230 into a single assembly. The tubular casing 210 is formed having a tubular cross sectional shape forming an equilateral convex polygon shape spanning between a first casing end 212 and a second casing end 214. The tubular casing 210 is designed having a uniform cross sectional shape extending a length thereof. Due to the uniform cross sectional area and low manufacturing cost, the tubular casing 210 is commonly manufactured using an extrusion process. The tubular casing 210 is preferably fabricated of a rigid material, such as plastic, metal, a composite, and the like. The interior of the tubular casing 210 defines a plurality of casing interior planar surfaces 216, wherein mating edges of each pair of adjacently located casing interior planar surfaces 216 forms a casing interior angular transition 218. The plurality of casing interior planar surfaces 216 defines a periphery of a casing interior volume. The exemplary embodiment includes four (4) equally dimensioned casing interior planar surfaces 216.

The shaft 220 is designed having an external surface forming a square frustum tubular shape. A shaft first end surface 222 defines a first end of the shaft 220 and a shaft second end surface 224 defines a second end of the shaft 220. The shaft first end surface 222 has a smaller cross sectional area compared to a cross sectional area of the shaft second end surface 224 and the cross sectional shape gradually transitions in size between the shaft first end surface 222 and the shaft second end surface 224 forming the square frustum shape. The cross section shape of the shaft is similar to the cross sectioned shape of the casing. A series of shaft external longitudinal surfaces 226 spans between the shaft first end surface 222 and shaft second end surface 224 of the shaft 220. Each of the plurality of planar shaft external longitudinal surfaces 226 of the shaft 220 are is trapezoidal and equal in size and shape. The number of shaft external longitudinal surfaces 226 equals the number of casing interior planar surfaces 216. The shaft 220 can be fabricated using any suitable manufacturing processes, including molding, machining, casting, and the like. The shaft 220 can be fabricated of a pliant material, a rigid material, or a pliant covered rigid material, such as a laminated elastomeric coating 228 applied over a rigid core.

Each elongated elastomeric member 230 is formed into a conical frustum shape. An elongated elastomeric member first end surface 232 defines a first end of the elongated elastomeric member 230 and an elongated elastomeric member second end surface 234 defines a second end of the elongated elastomeric member 230, wherein the elongated elastomeric member first end surface 232 is smaller than the elongated elastomeric member second end surface 234. An elongated member exterior surface 236 spans between a circumferential edge of the elongated elastomeric member first end surface 232 and a circumferential edge of the elongated elastomeric member second end surface 234. The exemplary elongated elastomeric member 230 is shaped having a rounded cross sectional shape, wherein the cross sectional shape can be elliptical, circular, and the like. It is understood that the cross sectional shape can also be formed having a triangular cross sectional shape, or a combination of a cornered segment and a rounded segment. The elongated elastomeric member 230 is preferably designed having a circular or elliptical cross sectional shape. The sidewall of the elongated elastomeric member 230 is formed having a gradually transition in the cross sectional shape extending between a peripheral edge of the elongated elastomeric member first end surface 232 and a peripheral edge of the elongated elastomeric member second end surface 234. The preferred transitional shape of the cross section along a length of the elongated elastomeric member 230 between the elongated elastomeric member first end surface 232 and the elongated elastomeric member second end surface 234 is linear. It is also understood that the transition between the elongated elastomeric member first end surface 232 and the elongated elastomeric member second end surface 234 can be of any suitable shape, including an arched section, a series of rings, fingers, and the like. When the elongated elastomeric member 230 is positioned contacting the shaft external longitudinal surface 226, the angle formed by a distal surface of the conical frustum shape of the elongated elastomeric member 230 coincides with the angle defined by the casing interior planar surface 216 of the tubular casing 210.

Each elongated elastomeric member 230 can be optimized to suit the target application. The elastomer hardness or modulus can be varied to obtain different torsional and axial resistance or spring rate in the same design envelope. Low modulus rubber would provide a soft spring, where as high modulus rubber would provide a very stiff spring. Typical hardness could include, but are not limited to, 20 Shore A durometer up to 60 Shore D durometer. A corresponding compressive or shear modulus range could be 20 psi to 1000 psi. The material for the elongated elastomeric members 230 can be selected from any of a variety of rubber, plastic, or other polymeric materials to obtain optimal properties of spring rate, fluid, environmental resistance, and the like. The elongated elastomeric member 230 is fabricated of any elastomeric or resilient material, including natural rubber, synthetic rubber, Nitrile, polyurethane, EPDM, silicone, fluoroelastomer, Epichlorohydrin, SBR, Polybutadiene, neoprene, thermoplastic elastomers, elastin, and the like.

Figure 7:
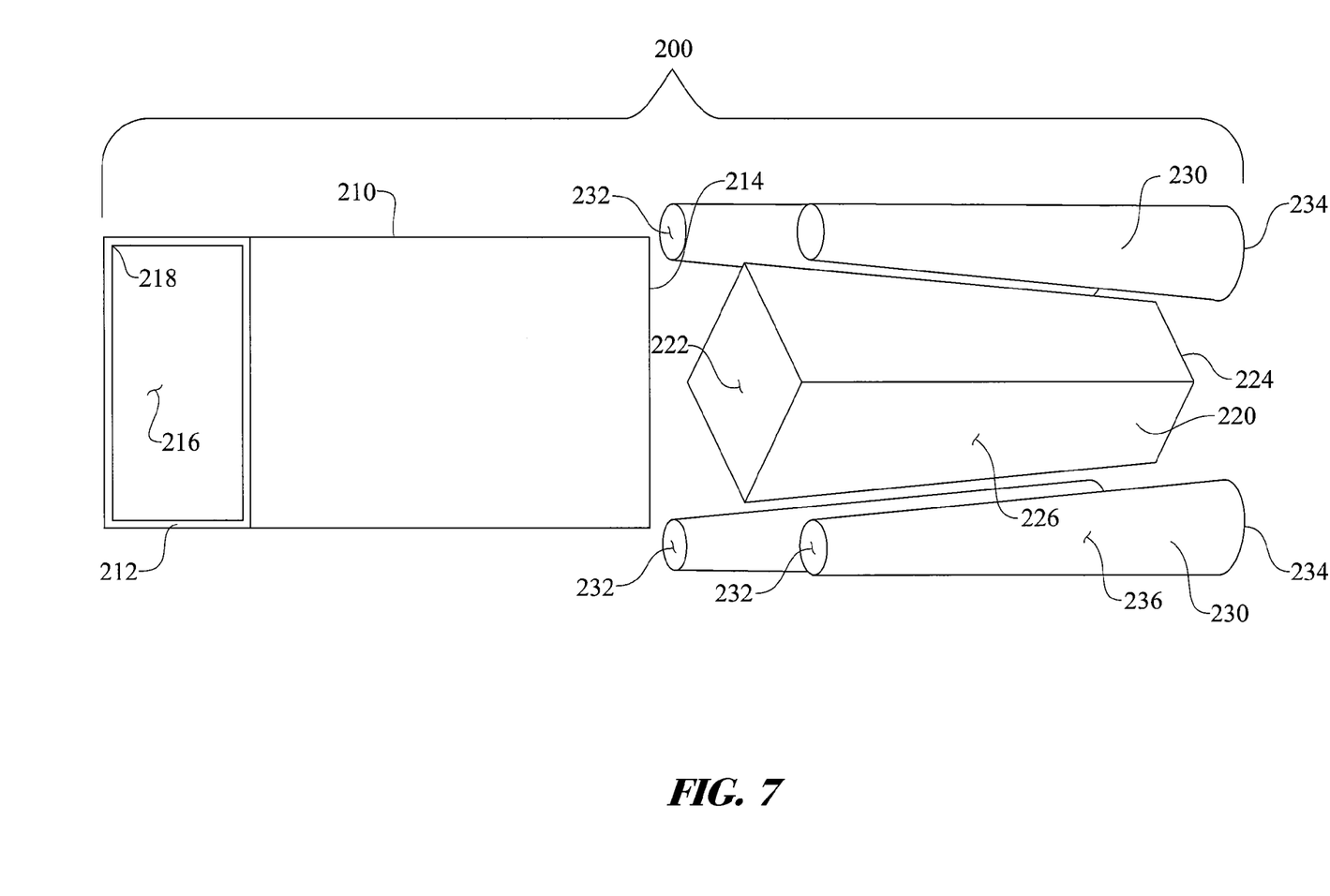
FIG. 7 presents an isometric exploded assembly view of the rotational and axial control spring introduced in FIG. 4.

The assembly of the rotational and axial control spring 200 is best represented in the exploded assembly view illustrated in FIG. 7. The rotational and axial control spring 200 is assembled by inserting the shaft 220 into an interior section of the tubular casing 210. The shaft 220 is rotated aligning each shaft external longitudinal surface 226 with a respective casing interior angular transition 218. The rotational and axial control spring 200 includes one elongated elastomeric member 230 for each shaft external longitudinal surface 226 of the shaft 220. One elongated elastomeric member 230 is installed contacting a respective shaft external longitudinal surface 226 and a pair of adjacently located casing interior planar surfaces 216 for each of the shaft external longitudinal surfaces 226.

Figure 4:
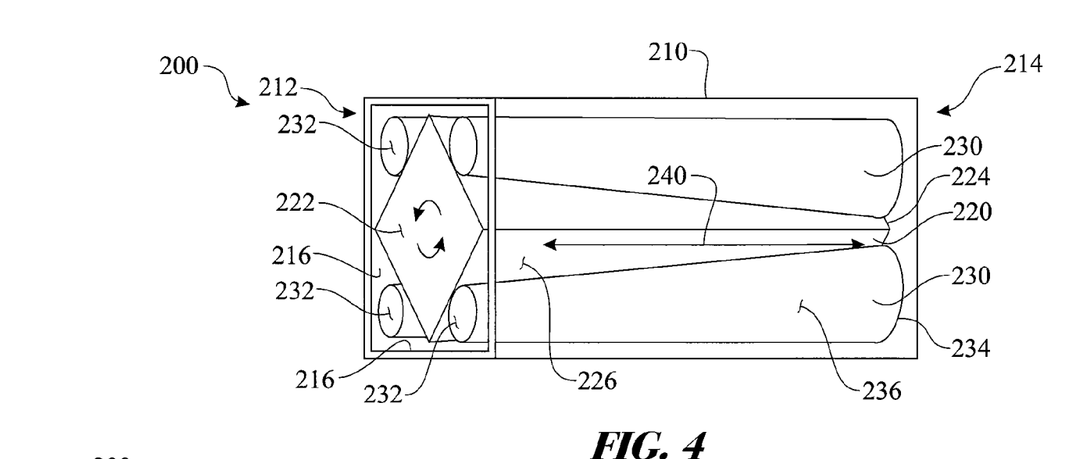
FIG. 4 presents an isometric view of an exemplary rotational and axial control spring.
Figure 5:
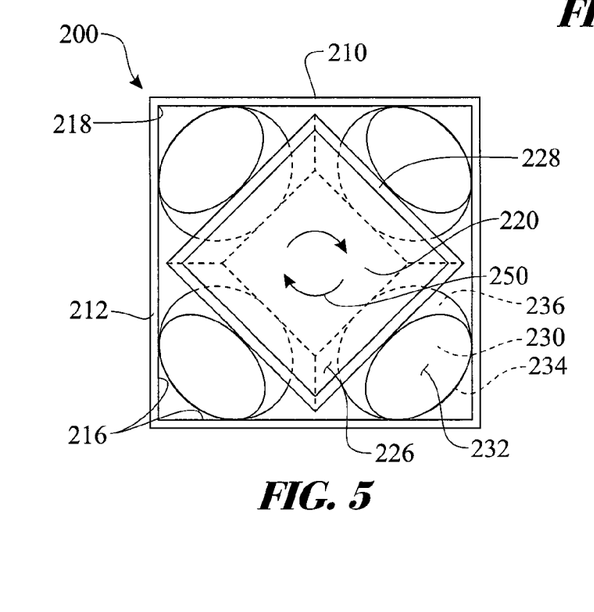
FIG. 5 presents an end elevation view of the rotational and axial control spring originally introduced in FIG. 4, the illustration presenting the rotational rubber spring in a normal, relaxed state.
Figure 6:
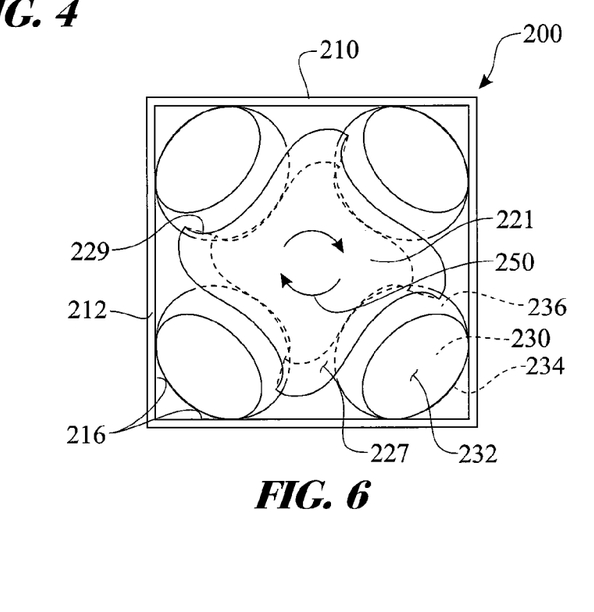
FIG. 6 presents an end elevation view of the rotational and axial control spring originally introduced in FIG. 4, the illustration presenting the rotational rubber spring being subjected to a torsional force.

In use, each elongated member exterior surface 236 of the respective elongated elastomeric member 230 engages with the respective shaft external longitudinal surface 226 and a pair of respective casing interior planar surfaces 116. The three contact points refrain rotation of the shaft 220 respective to the tubular casing 210 when subjected to a torsional force in a direction of a rotational motion 250. When undergoing the rotational motion 250, the pliancy of the elongated elastomeric member 230 enables incremental rotation of the shaft 220 respective to the tubular casing 210. As the motion continues, the elongated elastomeric member 230 is compressed, wherein the compression of the elongated elastomeric member 230 increases the resistance of the rotational motion 250. In addition, the rotational motion 250 utilizes each elongated elastomeric member 230 as a wedge, thus further increasing the resistance to the rotational motion 250. When the torsional force is removed, the pliancy of each the series of elongated elastomeric members 230 returns the shaft 220 to a natural, relaxed position.

In an alternative embodiment, the rotational and axial control spring 200 can include a twisted shaft 221, which includes a shaft elastomeric engaging deformation 229 for engaging with each elongated elastomeric member 230. The twisted section of the twisted shaft 221 increase the interaction between the twisted shaft 221 and the elongated elastomeric member 230. Additionally, the shape of the twisted shaft 221 increases the rotational distance of the twisted shaft 221 within the rotational and axial control spring 200. It is noted, twisted cams are limited, wherein the torsion resistance differs respective to the rotational direction, more specifically the torsional resistance differs between a clockwise or counterclockwise rotation. Additionally, the maximum rotation is also limited differently in clockwise or counterclockwise rotation.

One unique advantage of the rotational and axial control spring 200 over the rotational rubber spring 100 is the inclusion of the tapered shape. The square frustum shape of the shaft 220 restricts axial motion 240 of the elongated elastomeric members 230 to a direction from the larger shaft first end surface 222 towards the smaller shaft second end surface 224. Similarly, the conical frustum shape of each elongated elastomeric member 230 restricts axial motion 240 of the shaft 220 to a direction from the larger elongated elastomeric member second end surface 234 towards the smaller elongated elastomeric member first end surface 232. The restriction prevents the shaft 220 and/or any of the elongated elastomeric members 230 from moving axially or "walking out" of the interior chamber of the tubular casing 210 while in an application that is subjected to a combination of a torsional load and an axial load. Another advantage is the ability to shape each of the elongated elastomeric members 230 to fine-tune the dampening coefficient and the spring rate. The thickness, the density of the material, the shape of the sidewall 236, and the like can refine the characteristics of the elongated elastomeric member 230.

Figure 8:
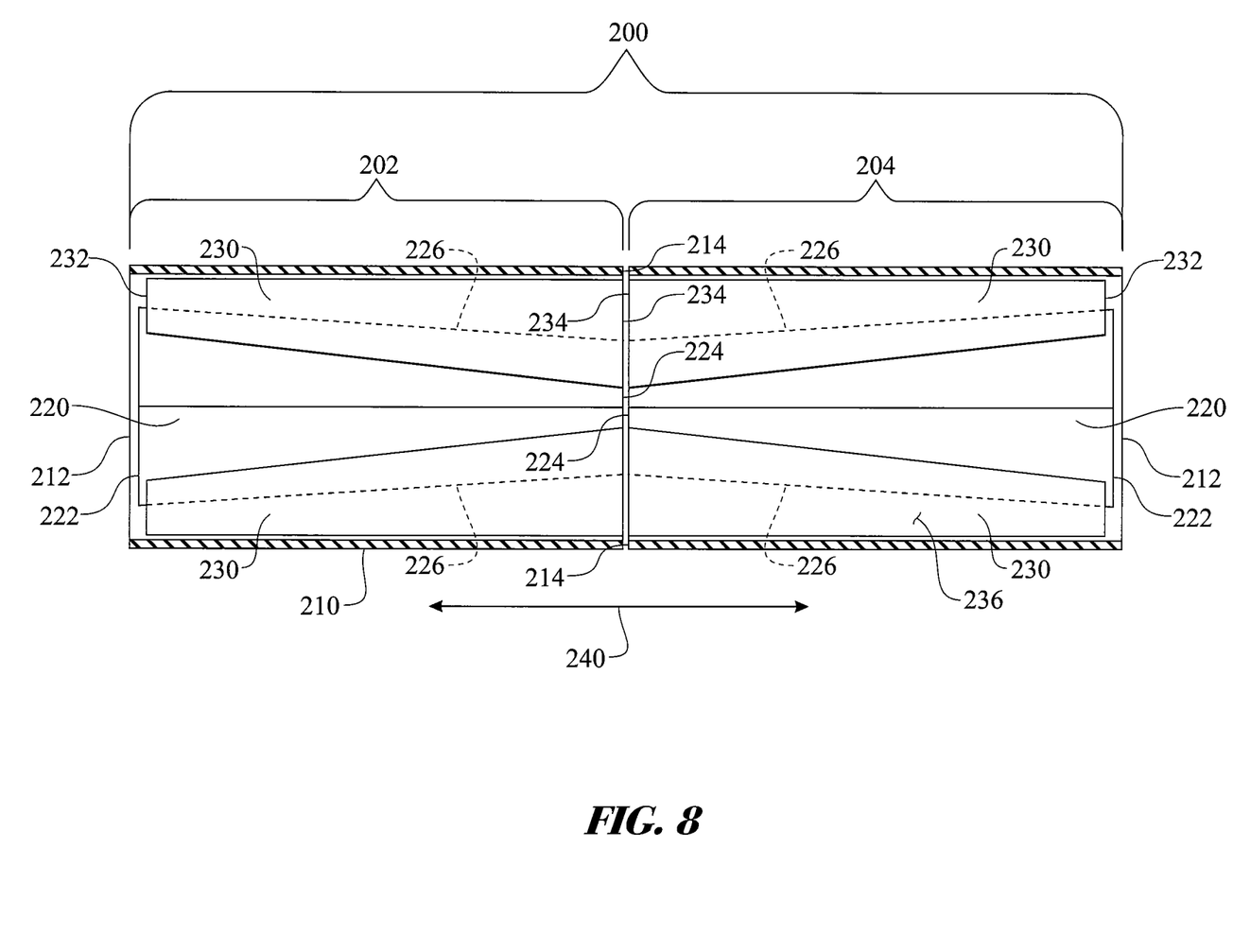
FIG. 8 presents a side elevation view of a pair of rotational and axial control springs originally introduced in FIG. 4, the pair being oriented with like larger elastomeric ends/smaller shaft ends being positioned adjacent to one another.

By arranging each of a pair of rotational and axial control spring subassemblies 202, 204 abutting like ends of one another along the longitudinal axis, as illustrated in FIG. 8, the pair 202, 204 restrains motion of the internal components along the axial motion 240. In a configuration where the pair of rotational and axial control spring subassemblies 202, 204 are arranged orienting the second casing ends 214 abutting one another (as illustrated), the configuration restrains axial motion 240 of the series of elongated elastomeric members 230 in both axial directions and the pair of shafts 220 from moving towards one another. In a configuration where the pair of rotational and axial control spring subassemblies 202, 204 are arranged orienting the first casing ends 212 abutting one another, the configuration restrains axial motion 240 of the pair of shafts 220 in both axial directions and the series of elongated elastomeric members 230 from moving towards one another. It is understood that the pair of rotational and axial control springs 200 can be joined together or integrated into a single unit. An integrated unit would join the pair of tubular casings 210 together and the pair of shafts 220 together.

Figure 9:
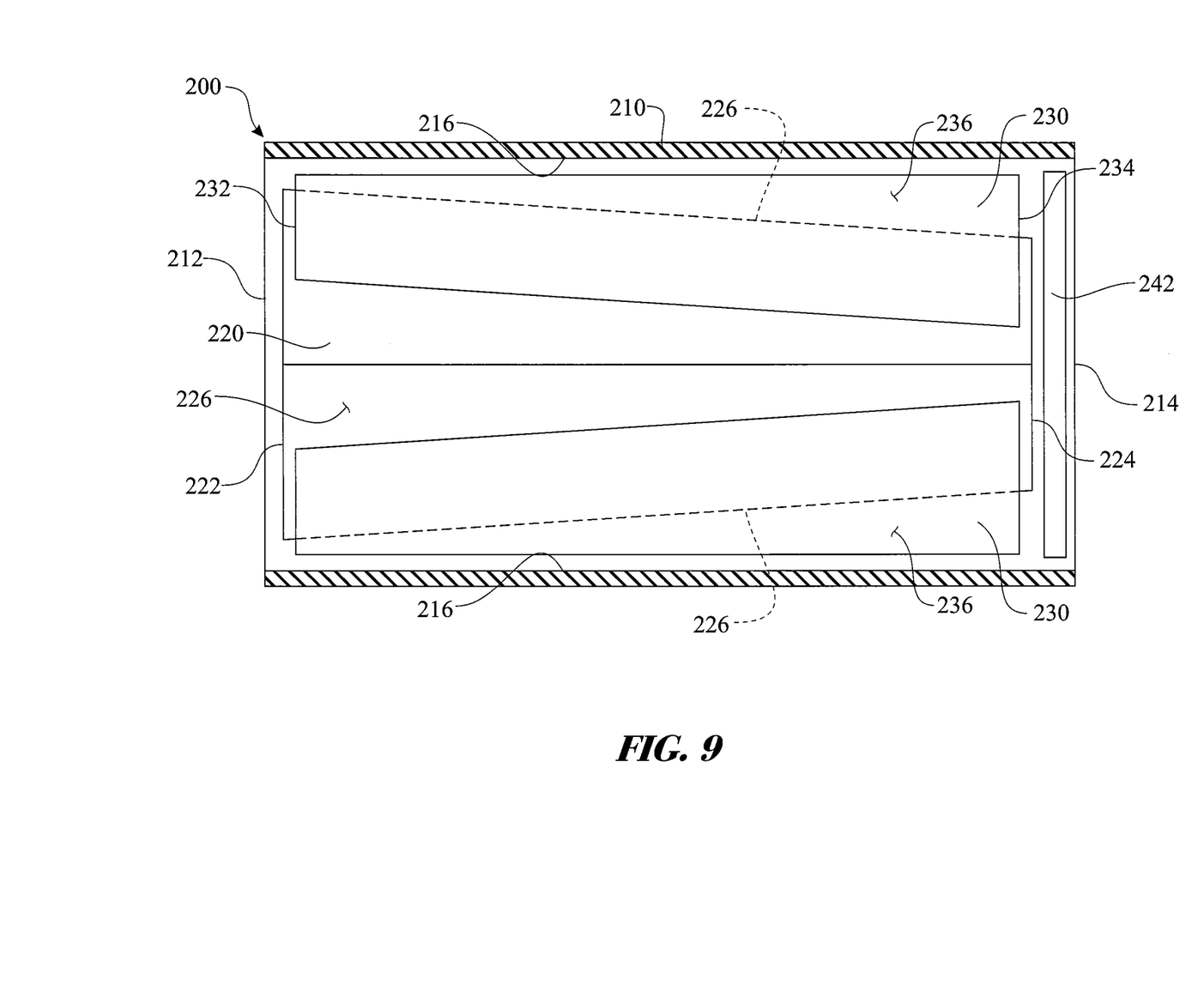
FIG. 9 presents a side elevation view of a modified rotational and axial control springs originally introduced in FIG. 4, the illustration introducing an axial retention member.

An optional axial retention member 242 can be integrated into the rotational and axial control spring 200 as illustrated in FIG. 9 to enhance axial control of the elongated elastomeric members 230 when located proximate the smaller shaft second end surface 224 (as illustrated). The optional axial retention member 242 can be integrated into the rotational and axial control spring 200 to enhance axial control of the shaft 220 when located proximate the larger shaft first end surface 222.

It is understood that by combining tapered elements, the designer can control axial motion 240 of one or more components in one or more axial direction. The follow presents several exemplary embodiments for accomplishing this function.

Figure 10:
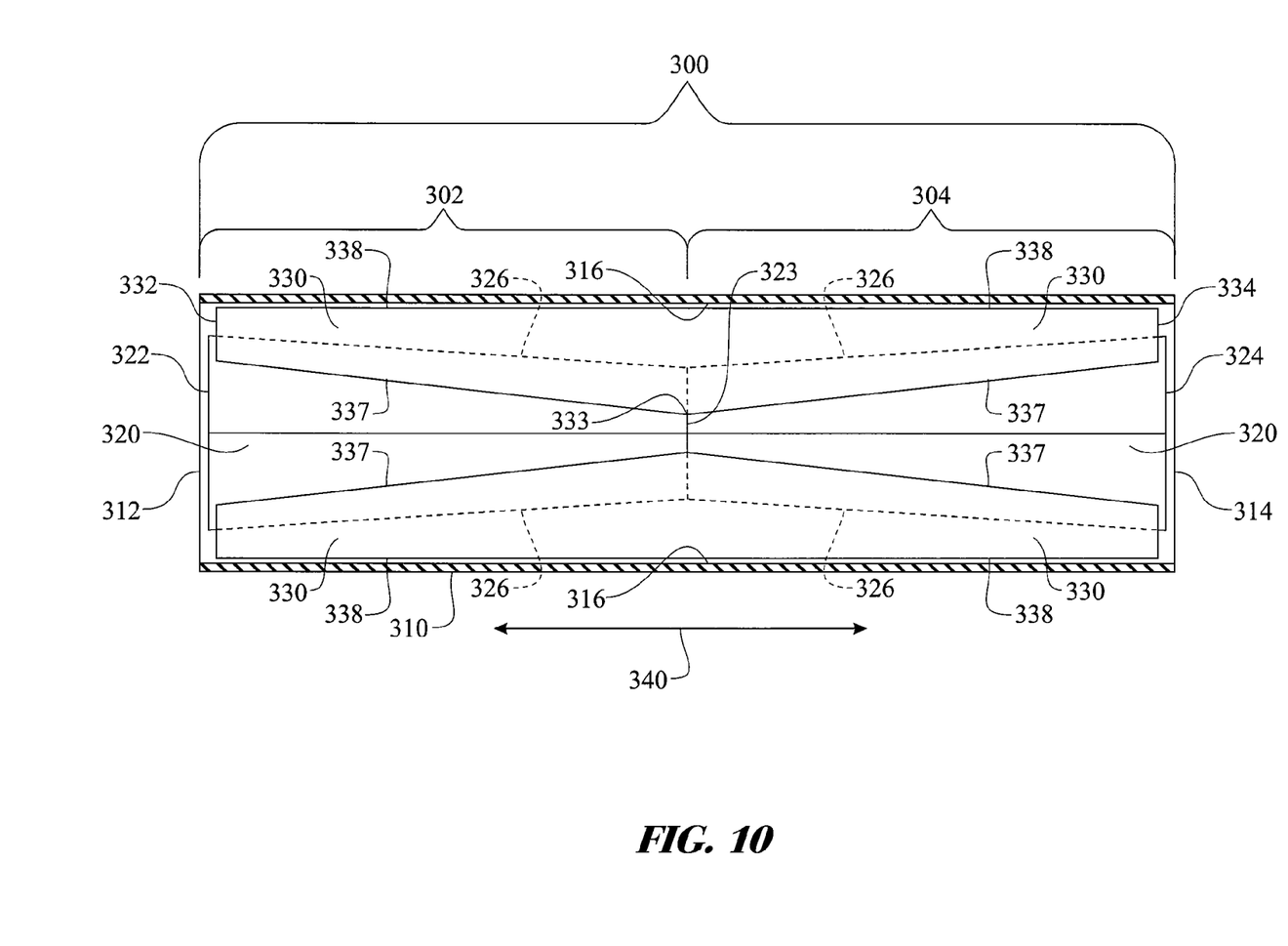
FIG. 10 presents a side elevation view of an alternative embodiment of a rotational and axial control spring, the rotational and axial control spring comprising a shaft having an hourglass shape and a series of elongated elastomeric members having a bi-conical, angled frustum shape.
Figure 11:
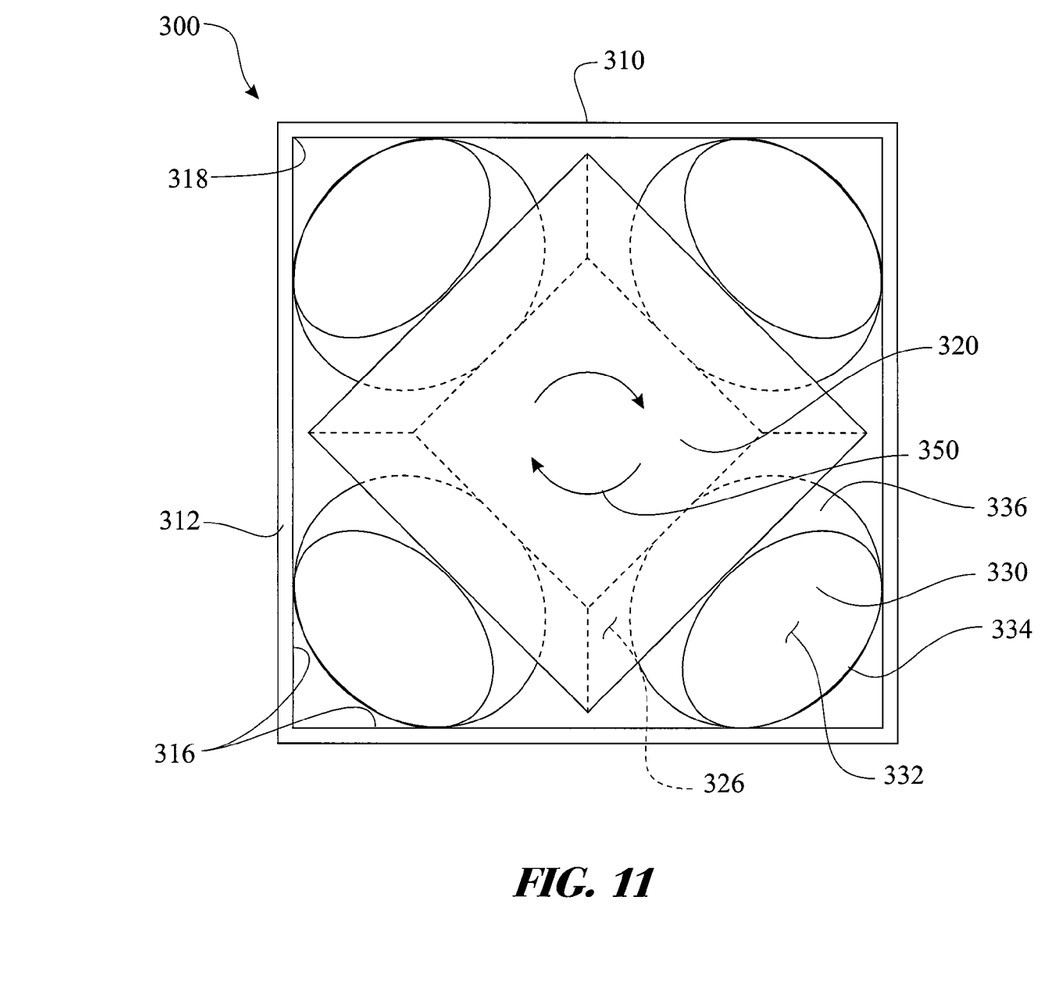
FIG. 11 presents an end elevation view of the rotational rubber spring originally introduced in FIG. 10, the illustration presenting the rotational rubber spring in a normal, relaxed state.

A modified version of the present invention can be provided by combining the shapes of the pair of rotational and axial control spring subassemblies 202, 204 to form a rotational and axial control spring 300 as illustrated in FIGS. 10 and 11. The rotational and axial control spring 300 can be described as being segmented into a first spring segment 302 and a second spring segment 304. The shaft 320 is designed having an hourglass shape, integrating two square frustum shaped segments together at a shaft central waist 323. Two square frustum shaped segments of the shaft 320 are joined aligning their longitudinal axis with one another. Each of the elongated elastomeric members 330 of a series of elongated elastomeric members 330 is formed by integrating two conical frustum shaped segments together at an elongated elastomeric member central section 333 together at an offset angle between longitudinal axes. The offset angle segments the elongated member exterior surface 336 into a linear casing contacting surface segment 337 and a triangularly shaped shaft contacting surface segment 338. The linear casing contacting surface segment 337 engages with a pair of adjacent casing interior planar surfaces 316 and the triangularly shaped shaft contacting surface segment 338 engages with a shaft external longitudinal surface 326 of the shaft 320. Each of the plurality of planar shaft external longitudinal surfaces 326 of the shaft 320 are is trapezoidal and equal in size and shape. The interface between the hourglass shaped shaft 320 and the angled bi-conical shaped elongated elastomeric member 330 retains each of the shaft 320 and elongated elastomeric members 330 from any axial motion 340 in either direction.

Figure 12:
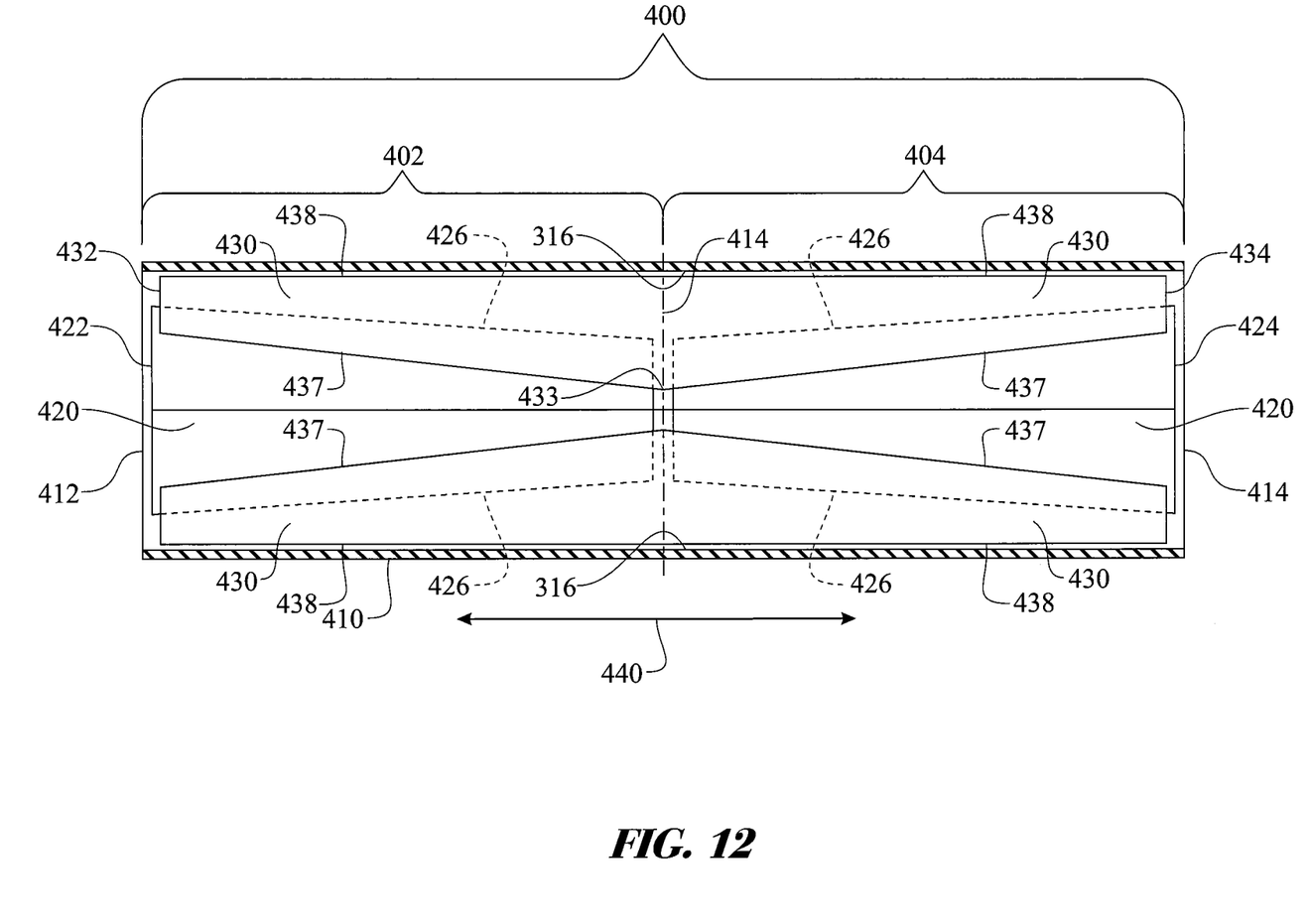
FIG. 12 presents a side elevation view of another alternative embodiment of a rotational and axial control spring, the rotational and axial control spring comprising a pair of square frustum shaped shafts oriented in opposite directions, the pair of shafts engaging with a series of bi-conical, angled frustum shaped elongated elastomeric members.

Another modified version of the present invention can be provided by combining the shapes of the pair of rotational and axial control spring subassemblies 202, 204 to form a rotational and axial control spring 400 as illustrated in FIG. 12. The rotational and axial control spring 400 is similar to the rotational and axial control spring 300, wherein the rotational and axial control spring 400 incorporates a pair of square frustum shaped shafts 420, whereas the rotational and axial control spring 300 incorporates a single hourglass shaped shaft 320. Like features of the rotational and axial control spring 400 and the rotational and axial control spring 300 are numbered the same except preceded by the numeral '4'. The rotational and axial control spring 400 is assembled by inserting each the series of elongated elastomeric member 430 into an interior of the tubular casing 410. Each shaft 420 is subsequently inserted into the interior of the tubular casing 410. A linear casing contacting surface segment 437 engages with a pair of adjacent casing interior planar surfaces 416 and the triangularly shaped shaft contacting surface segment 438 engages with a shaft external longitudinal surface 426 of the shaft 420. The interface between the pair of shafts 420 and the angled bi-conical shaped elongated elastomeric member 430 retains each of the series of elongated elastomeric members 330 from any axial motion 340 in either direction and the shaft 320 from walking inward towards a center of the rotational and axial control spring 400.

It is understood that the rotational and axial control spring can be provided in other configurations. One configuration utilizes a shaft similar in shape to the shaft 320 and a series of eight (8) elongated elastomeric members 230. The elongated elastomeric members 230 would be arranged abutting the wider ends elongated elastomeric member second end surface 234 against one another and oriented contacting the shaft external longitudinal surface 326. The subassembly is then slideably assembled within an interior of the tubular casing 210. The hourglass shape of the shaft 320 retains each of the series of eight (8) elongated elastomeric members 230 in axial position.

Although the exemplary rotational and axial control springs 200, 300, 400 are configured having four (4) equally sized casing interior planar surfaces 216, 316, 416 it is understood that the rotational and axial control spring can be configured having three (3) or more equally sized casing interior planar surfaces 216, 316, 416 wherein one skilled in the art would recognize that the greater the number of sides, the lower the allowable rotational angle. Several examples are presented in FIGS. 13 through 15.

Figure 13:
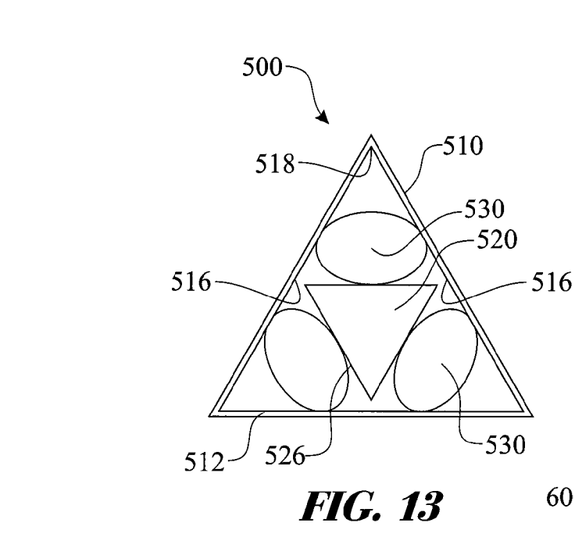
FIG. 13 presents an end elevation view of another exemplary rotational rubber spring wherein the shaft comprises three external planar surfaces and the casing comprises three interior planar surfaces.

A triangular shaped rotational and axial control spring 500 is presented in FIG. 13. The triangular shaped rotational and axial control spring 500 is similar to the rotational and axial control spring 200, wherein the distinction is the number of sides. The triangular shaped rotational and axial control spring 500 is designed having three (3) equally dimensioned sides and the rotational and axial control spring 200 has four (4) equally dimensioned sides. Like features of the triangular shaped rotational and axial control spring 500 and the rotational and axial control spring 200 are numbered the same except preceded by the numeral '5'. The triangular shaped rotational and axial control spring 500 would be configured incorporating like tapered features of the rotational and axial control spring 200 as previously described.

Figure 14:
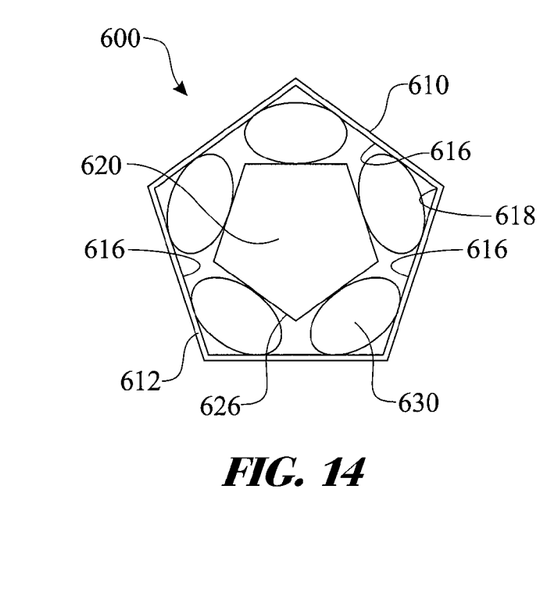
FIG. 14 presents an end elevation view of another exemplary rotational rubber spring wherein the shaft comprises five external planar surfaces and the casing comprises five interior planar surfaces.

A pentagonal shaped rotational and axial control spring 600 is presented in FIG. 14. The pentagonal shaped rotational and axial control spring 600 is similar to the rotational and axial control spring 200, wherein the distinction is the number of sides. The pentagonal shaped rotational and axial control spring 600 is designed having five (5) equally dimensioned sides and the rotational and axial control spring 200 has four (4) equally dimensioned sides. Like features of the hexagonal shaped rotational and axial control spring 600 and the rotational and axial control spring 200 are numbered the same except preceded by the numeral '6'. The pentagonal shaped rotational and axial control spring 600 would be configured incorporating like tapered features of the rotational and axial control spring 200 as previously described.

Figure 15:
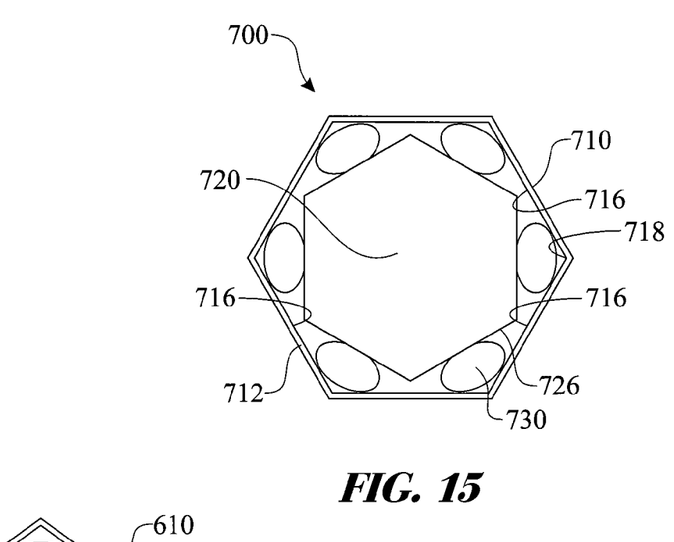
FIG. 15 presents an end elevation view of another exemplary rotational rubber spring wherein the shaft comprises three external planar surfaces and the casing comprises three interior planar surfaces.

A hexagonal shaped rotational and axial control spring 700 is presented in FIG. 15. The hexagonal shaped rotational and axial control spring 700 is similar to the rotational and axial control spring 200, wherein the distinction is the number of sides. The hexagonal shaped rotational and axial control spring 700 is designed having six (6) equally dimensioned sides and the rotational and axial control spring 200 has four (4) equally dimensioned sides. Like features of the hexagonal shaped rotational and axial control spring 700 and the rotational and axial control spring 200 are numbered the same except preceded by the numeral '7'. The hexagonal shaped rotational and axial control spring 700 would be configured incorporating like tapered features of the rotational and axial control spring 200 as previously described.

Although the exemplary embodiments present rotational and axial control springs having three (3), four (4), five (5), and six (6) sides, it is understood that the rotational and axial control spring can be designed to have seven (7), eight (8), nine (9), ten (10) or more sides. The greater the number of sides, the lower the maximum torsional rotation. The rotation is limited to a maximum deflection of one-half of a rotation from the original position (wherein the shaft external longitudinal surface 226 is aligned with the casing interior angular transition 218) towards a second indexed original position (wherein the shaft external longitudinal surface 226 is aligned with an adjacent casing interior angular transition 218). In other words, wherein the rotation of the shaft 220 is from an original position where the shaft external longitudinal surface 226 is aligned with the casing interior angular transition 218 to a position where the shaft external longitudinal surface 226 is in registration with a facing casing interior planar surface 216. The following table presents a maximum torsional rotation respective to the number of shaft external longitudinal surfaces 226.

TABLE

ROTATION BASED UPON NUMBER OF SIDES OF SPRING

| Cross Sectional Shape | Number of Sides | Maximum Degree of Rotation |
|---|---|---|
| Triangular | 3 | 60 Degrees |
| Square | 4 | 45 Degrees |
| Pentagon | 5 | 36 Degrees |
| Hextagon | 6 | 30 Degrees |

The exemplary embodiment presents a rotational and axial control spring 200 including an elongated elastomeric member 230 fabricated of an elastomeric material. It is understood that the elongated elastomeric member 230 can actually be fabricated of a rigid material or having the elastomeric material laminated upon a rigid material. The spring and dampening functions would be provided by a shaft 210 fabricated of an elastomeric material.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

LISTING OF REFERENCE NUMBERS

| Ref. No. | Description |
|---|---|
| 100 | rotational rubber spring |
| 110 | tubular casing |
| 112 | first casing end |
| 114 | second casing end |
| 116 | casing interior planar surface |
| 118 | casing interior angular transition |
| 120 | shaft |
| 121 | twisted shaft |
| 122 | shaft first end surface |
| 124 | shaft second end surface |
| 126 | shaft external longitudinal surface |
| 127 | twisted shaft external longitudinal surface |
| 129 | shaft twisted configuration |
| 130 | elongated elastomeric member |
| 132 | elongated elastomeric member first end surface |
| 134 | elongated elastomeric member second end surface |
| 136 | elongated member exterior surface |
| 140 | axial motion |
| 150 | rotational motion |
| 200 | rotational and axial control spring |
| 202 | first spring segment |
| 204 | second spring segment |
| 210 | tubular casing |
| 212 | first casing end |
| 214 | second casing end |
| 216 | casing interior planar surface |
| 218 | casing interior angular transition |
| 220 | shaft |
| 221 | twisted shaft |
| 222 | shaft first end surface |
| 224 | shaft second end surface |
| 226 | shaft external longitudinal surface |
| 227 | twisted shaft external longitudinal surface |
| 228 | laminated elastomeric coating |
| 229 | shaft twisted configuration |
| 230 | elongated elastomeric member |
| 232 | elongated elastomeric member first end surface |
| 234 | elongated elastomeric member second end surface |
| 236 | elongated member exterior surface |
| 240 | axial motion |
| 242 | axial retention member |
| 250 | rotational motion |
| 300 | rotational and axial control spring |
| 302 | first spring segment |
| 304 | second spring segment |
| 310 | tubular casing |
| 312 | first casing end |
| 314 | second casing end |
| 316 | casing interior planar surface |
| 318 | casing interior angular transition |
| 320 | shaft |
| 322 | shaft first end surface |
| 323 | shaft central waist |
| 324 | shaft second end surface |
| 326 | shaft external longitudinal surface |
| 330 | elongated elastomeric member |
| 332 | elongated elastomeric member first end surface |
| 333 | elongated elastomeric member central section |
| 334 | elongated elastomeric member second end surface |
| 336 | elongated member exterior surface |
| 337 | linear casing contacting surface segment |
| 338 | triangularly shaped shaft contacting surface segment |
| 340 | axial motion |
| 342 | axial retention member |
| 350 | rotational motion |
| 400 | rotational and axial control spring |
| 402 | first spring segment |
| 404 | second spring segment |
| 410 | tubular casing |

-continued

LISTING OF REFERENCE NUMBERS

| Ref. No. | Description |
|---|---|
| 412 | first casing end |
| 414 | second casing end |
| 416 | casing interior planar surface |
| 418 | casing interior angular transition |
| 420 | shaft |
| 422 | shaft first end surface |
| 423 | shaft central waist |
| 424 | shaft second end surface |
| 426 | shaft external longitudinal surface |
| 430 | elongated elastomeric member |
| 432 | elongated elastomeric member first end surface |
| 433 | elongated elastomeric member central section |
| 434 | elongated elastomeric member second end surface |
| 436 | elongated member exterior surface |
| 437 | linear casing contacting surface segment |
| 438 | triangularly shaped shaft contacting surface segment |
| 440 | axial motion |
| 442 | axial retention member |
| 500 | triangular shaped rotational and axial control spring |
| 510 | tubular triangularly shaped casing |
| 512 | casing end |
| 516 | casing interior planar surface |
| 518 | casing interior angular transition |
| 520 | shaft |
| 530 | elongated elastomeric member |
| 600 | pentagonal shaped rotational and axial control spring |
| 610 | tubular pentagonally shaped casing |
| 612 | casing end |
| 616 | casing interior planar surface |
| 618 | casing interior angular transition |
| 620 | shaft |
| 630 | elongated elastomeric member |
| 700 | hexagonal shaped rotational and axial control spring |
| 710 | tubular hexagonally shaped casing |
| 712 | casing end |
| 716 | casing interior planar surface |
| 718 | casing interior angular transition |
| 720 | shaft |
| 730 | elongated elastomeric member |

What is claimed is:

1. A torsional spring and axial control device, comprising:
a shaft having a plurality of planar shaft external longitudinal surfaces extending between a peripheral edge of a first shaft end and a peripheral edge of a second shaft end, wherein a cross sectional area of the first shaft end is smaller compared to a cross sectional area of the second shaft end and a cross sectional shape that gradually transitions in size between the first shaft end and the second shaft end, wherein each of the plurality of planar shaft external longitudinal surfaces is trapezoidal and equal in size and shape;
a series of elongated elastomeric members, each elongated elastomeric member having a first elastomeric member end and a second elastomeric member end, wherein the first elastomeric member end has a smaller cross sectional area compared to a cross sectional area of the second elastomeric member end and a cross sectional shape of the elastomeric member that gradually transitions in size between the first elastomeric member end and the second elastomeric member end; and
a tubular casing comprising a plurality of planar interior surfaces defining a casing interior, wherein adjacent edges of adjacent pairs of planar interior surfaces are joined along an angular transition,
wherein the shaft is inserted within the casing interior and each of the series of elongated elastomeric members is positioned contacting one respective exterior planar shaft surface and a pair of adjacent interior planar casing surfaces, wherein a resulting central axis of each of the tapered elongated members is arranged to converge upon a central axis of the shaft, and wherein the series of elongated elastomeric members provides a resistive rotational spring force between the shaft and the casing.

2. A torsional spring and axial control device as recited in claim 1, wherein said tubular casing has a uniform cross sectional shape along a longitudinal length thereof.

3. A torsional spring and axial control device as recited in claim 1, wherein said gradual transition in size between said first elastomeric member end and said second elastomeric member end is linear along a longitudinal length thereof.

4. A torsional spring and axial control device as recited in claim 1, wherein said gradual transition in size between said first shaft end and said second shaft end is linear along a longitudinal length thereof.

5. A torsional spring and axial control device as recited in claim 1, wherein said shaft is configured as a twisted shaft.

6. A torsional spring and axial control device as recited in claim 1, wherein said shaft is formed having a square frustum shape.

7. A torsional spring and axial control device as recited in claim 1, wherein said tubular casing is formed n number of sides and said shaft is formed having n number of shaft exterior surfaces, wherein n is selected from a group consisting of:
a) three (3) sides,
b) four (4) sides,
c) five (5) sides, and
d) six (6) sides.

8. A torsional spring and axial control device, comprising:
a shaft having a plurality of planar shaft external longitudinal surfaces extending between a peripheral edge of a first shaft end and a peripheral edge of a second shaft end, wherein a cross sectional area of the first shaft end is smaller compared to a cross sectional area of the second shaft end and a cross sectional shape that gradually transitions in size between the first shaft end and the second shaft end, wherein each of the plurality of planar shaft external longitudinal surfaces is trapezoidal and equal in size and shape;
a series of elongated elastomeric members, each elongated elastomeric member having a first elastomeric member end and a second elastomeric member end, wherein the first elastomeric member end has a smaller cross sectional area compared to a cross sectional area of the second elastomeric member end and a cross sectional shape of the elastomeric member gradually transitioning in size between the first elastomeric member end and the second elastomeric member end; and
a tubular casing comprising a plurality of planar interior surfaces defining a casing interior, wherein said tubular casing has a uniform cross sectional shape along a length thereof and adjacent edges of adjacent pairs of planar interior surfaces are joined along an angular transition,
wherein said shaft is inserted within said casing interior and each of said series of elongated elastomeric members is positioned contacting one respective exterior planar shaft surface and a pair of adjacent interior planar casing surfaces, wherein a resulting central axis of each of the tapered elongated members is arranged to converge upon a central axis of the shaft, and wherein said series of elongated elastomeric members provides a resistive rotational spring force between said shaft and said casing.

9. A torsional spring and axial control device as recited in claim 8, wherein said shaft is configured as a twisted shaft.

10. A torsional spring and axial control device as recited in claim 8, wherein said gradual transition in size between said first elastomeric member end and said second elastomeric member end is linear along a length thereof.

11. A torsional spring and axial control device as recited in claim 8, wherein said gradual transition in size between said first tubular casing end and said second tubular casing end is linear along a length thereof.

12. A torsional spring and axial control device as recited in claim 11, wherein said gradual transition in size between said first elastomeric member end and said second elastomeric member end is linear along a length thereof.

13. A torsional spring and axial control device as recited in claim 8, wherein said tubular casing is formed having a square frustum shape.

14. A torsional spring and axial control device as recited in claim 8, wherein said tubular casing is formed n number of sides and said shaft is formed having n number of shaft exterior surfaces, wherein n is selected from a group consisting of:
   a) three (3) sides,
   b) four (4) sides,
   c) five (5) sides, and
   d) six (6) sides.

15. A torsional spring and axial control device, comprising:
   a tubular casing having a first casing end, a second casing end, and a plurality of planar walls extending therebetween, each planar wall defining a casing interior, wherein adjacent edges of adjacent pairs of planar interior surfaces are joined along an angular transition, a shaft having a first shaft end, a shaft central waist, and a second shaft end, said shaft central waist is smaller than said first shaft end and said second shaft end, a first series of planar shaft external longitudinal surfaces extending between a peripheral edge of said first shaft end and a peripheral edge of said shaft central waist, said first series of planar shaft external longitudinal surfaces forming a first polygonal frustum and a second series of planar shaft external longitudinal surfaces extending between a peripheral edge of said shaft central waist and a peripheral edge of said second shaft end, said second series of planar shaft external longitudinal surfaces forming a second polygonal frustum, wherein said first polygonal frustum and said second polygonal frustum are arranged mirroring one another with said first polygonal frustum & being oriented axially with and opposing said second polygonal frustum;
   a series of elongated elastomeric members, each elongated elastomeric members having a first elongated member end, an elongated member central waist, and a second elongated member end, said elongated member central waist is smaller than said first elongated member end and said second elongated member end, a first exterior surface segment extending between a peripheral edge of said first elongated member end and a peripheral edge of said elongated member central waist, said first exterior surface forming a first conical frustum and a second exterior surface segment extending between a peripheral edge of said second elongated member end and a peripheral edge of said elongated member central waist, said second exterior surface forming a second conical frustum, wherein said first conical frustum is oriented opposing said second conical frustum, said first and second conical frustums are arranged having longitudinal axes oriented in a non-parallel arrangement, wherein said elongated elastomeric member presents a triangular profile having a linear edge spanning a length between said first elongated elastomeric member end and said second elongated elastomeric member end and a "V" shaped opposing edge; and
   wherein said shaft is inserted within said casing interior and each of said series of elongated elastomeric members is positioned contacting one respective exterior planar shaft surface and a pair of adjacent interior planar casing surfaces, wherein a resulting central axis of each of the tapered elongated members is arranged to converge upon a central axis of the shaft, and wherein said series of elongated elastomeric members provides a resistive rotational spring force between said shaft and said casing.

16. A torsional spring and axial control device as recited in claim 15, wherein said tubular casing has a uniform cross sectional shape along a length thereof.

17. A torsional spring and axial control device as recited in claim 15, wherein said gradual transition in size between said first elastomeric member end and said second elastomeric member end is linear along a length thereof.

18. A torsional spring and axial control device as recited in claim 15, wherein said gradual transition in size between said first tubular casing end and said second tubular casing end is linear along a length thereof.

19. A torsional spring and axial control device as recited in claim 18, wherein said gradual transition in size between said first elastomeric member end and said second elastomeric member end is linear along a length thereof.

20. A torsional spring and axial control device as recited in claim 15, wherein said tubular casing is formed n number of sides and said shaft is formed having n number of shaft exterior surfaces, wherein n is selected from a group consisting of:
   a) three (3) sides,
   b) four (4) sides,
   c) five (5) sides, and
   d) six (6) sides.

* * * * *